(12) United States Patent
Yang et al.

(10) Patent No.: US 11,379,006 B2
(45) Date of Patent: Jul. 5, 2022

(54) ELECTRONIC DEVICE

(71) Applicant: Acer Incorporated, New Taipei (TW)

(72) Inventors: Yi-Hsuan Yang, New Taipei (TW);
Chuan-Hua Wang, New Taipei (TW);
Wu-Chen Lee, New Taipei (TW);
Cheng-Nan Ling, New Taipei (TW);
Chia-Bo Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/178,267

(22) Filed: Feb. 18, 2021

(65) Prior Publication Data

US 2022/0004226 A1    Jan. 6, 2022

(30) Foreign Application Priority Data

Jul. 2, 2020 (TW) ................................. 109208414

(51) Int. Cl.
*G06F 1/16* (2006.01)
(52) U.S. Cl.
CPC .......... *G06F 1/1647* (2013.01); *G06F 1/1681* (2013.01); *G06F 1/1616* (2013.01)
(58) Field of Classification Search
CPC ..... G06F 1/1647; G06F 1/1649; G06F 1/1681
See application file for complete search history.

(56) References Cited

U.S. PATENT DOCUMENTS

| | | | |
|---|---|---|---|
| 6,404,623 B1 * | 6/2002 | Koshika | G06F 1/165 |
| | | | 361/679.04 |
| 9,501,097 B2 * | 11/2016 | Moser | G06F 1/1649 |
| 10,627,874 B2 * | 4/2020 | Lin | F16M 13/005 |
| 11,132,026 B2 * | 9/2021 | Yang | G06F 1/1647 |
| 11,132,031 B2 * | 9/2021 | Lin | G06F 1/165 |
| 11,226,651 B2 * | 1/2022 | Chen | G06F 1/1681 |
| 2010/0033916 A1 * | 2/2010 | Douglas | G06F 1/1654 |
| | | | 361/679.28 |
| 2018/0210504 A1 * | 7/2018 | Moser | G06F 1/1679 |
| 2020/0241603 A1 * | 7/2020 | Lin | E05D 3/02 |
| 2020/0264672 A1 * | 8/2020 | Morino | G06F 1/1637 |
| 2021/0011525 A1 * | 1/2021 | Lin | G06F 1/1616 |
| 2021/0041915 A1 * | 2/2021 | Moser | G06F 1/1649 |
| 2021/0124398 A1 * | 4/2021 | Yang | G06F 1/1616 |

(Continued)

FOREIGN PATENT DOCUMENTS

CN           2509629         9/2002

*Primary Examiner* — Adrian S Wilson
(74) *Attorney, Agent, or Firm* — JCIPRNET

(57) ABSTRACT

An electronic device, including a host, a main display, an auxiliary display, and a lifting mechanism, is provided. The main display is pivoted to the host. The auxiliary display is disposed on the host. The lifting mechanism is disposed between the auxiliary display and the host, and includes a first bracket, a positioning pin, a second bracket, and a torsional spring. The first bracket is fixed to the host. The positioning pin is retractably disposed at the first bracket. The second bracket is fixed to the auxiliary display. The second bracket is pivoted to the first bracket and has a positioning notch. The positioning pin is located outside the positioning notch or is engaged with the positioning notch. The torsional spring has a first end and a second end that are opposite. The first end is connected to the first bracket. The second end is connected to the second bracket.

10 Claims, 5 Drawing Sheets

(56) References Cited

U.S. PATENT DOCUMENTS

2021/0200269 A1\* 7/2021 Chen .................. G06F 1/165
2021/0365069 A1\* 11/2021 Wen .................. G06F 1/1624
2022/0004227 A1\* 1/2022 Chen .................. G06F 1/1681

\* cited by examiner

ELECTRONIC DEVICE

CROSS-REFERENCE TO RELATED APPLICATION

This application claims the priority benefit of Taiwan application serial no. 109208414, filed on Jul. 2, 2020. The entirety of the above-mentioned patent application is hereby incorporated by reference herein and made a part of this specification.

BACKGROUND OF THE INVENTION

1. Field of the Invention

The disclosure relates to an electronic device, and in particular, to an electronic device including a main display and an auxiliary display.

2. Description of Related Art

Notebook computers have become indispensable tools for modern people due to features of multi-task processing, high computing efficiency, and being easy to carry, and the like. Generally, a notebook computer includes a host and a display, where the display is pivoted to the host, and a keyboard is integrated on the host.

To improve operation flexibility of a user, a notebook computer in which an auxiliary display is integrated on the host has been proposed at present. Specifically, the auxiliary display and the keyboard are located in the same working plane, and the auxiliary display and the keyboard are disposed in parallel. Because the angle and the height of most auxiliary displays cannot be adjusted, the auxiliary display is inconvenient to operate for a user, and eyestrain is easily caused. In addition, although an auxiliary display with the adjustable angle and height has been proposed, the support stability of a lifted auxiliary display is insufficient. Therefore, in a process of the user operating the auxiliary display, the auxiliary display easily shakes or sinks.

SUMMARY OF THE INVENTION

The disclosure provides an electronic device. The electronic device not only has excellent operation flexibility, but also has good operation reliability.

The disclosure provides an electronic device, including a host, a main display, an auxiliary display, and a lifting mechanism. The main display is pivoted to the host, and the auxiliary display is disposed on the host. The lifting mechanism is disposed between the auxiliary display and the host. The lifting mechanism includes a first bracket, a positioning pin, a second bracket, and a torsional spring. The first bracket is fixed to the host. The positioning pin is retractably disposed at the first bracket. The second bracket is fixed to the auxiliary display, where the second bracket is pivoted to the first bracket and the second bracket has a positioning notch. The positioning pin is located outside the positioning notch or is engaged with the positioning notch. The torsional spring includes a first end and a second end that are opposite, where the first end is connected to the first bracket, and the second end is connected to the second bracket.

Based on the foregoing, the electronic device of the disclosure integrates the auxiliary display, where the angle and the height of the auxiliary display are adjustable, to help a user operate the auxiliary display, and improve comfort of the user watching the auxiliary display. In addition, a lifted auxiliary display can be stably supported and positioned, and does not easily shake or sink due to operation of the user on the auxiliary display. That is, the electronic device of the disclosure has excellent operation reliability.

To make the foregoing features and advantages of the disclosure more apparent and easier to understand, the following provides a detailed description by listing embodiments with reference to the accompanying drawings.

DESCRIPTION OF THE EMBODIMENTS

Figure 1:
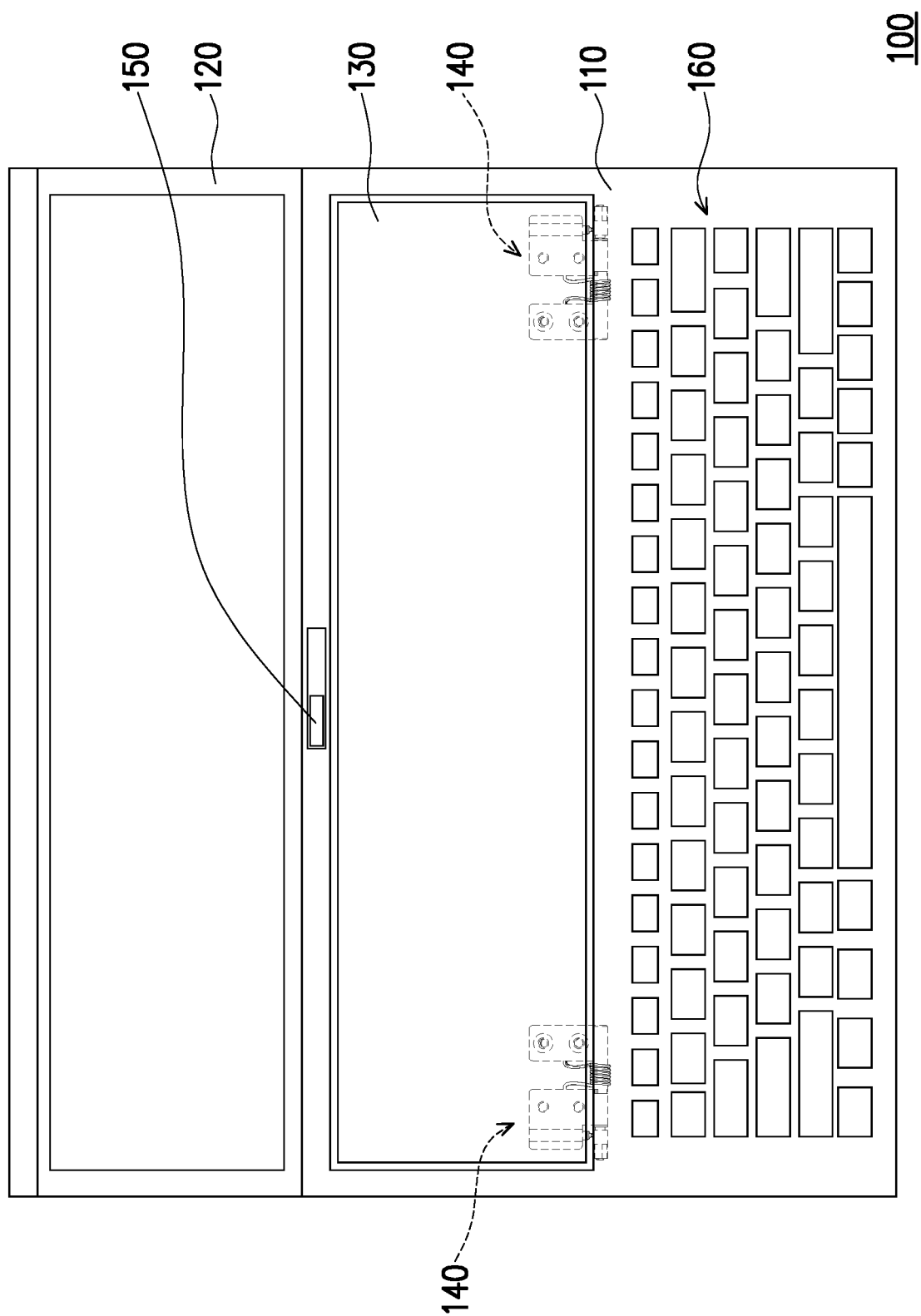
FIG. 1 is a schematic top view of an electronic device according to an embodiment of the disclosure.
Figure 2:
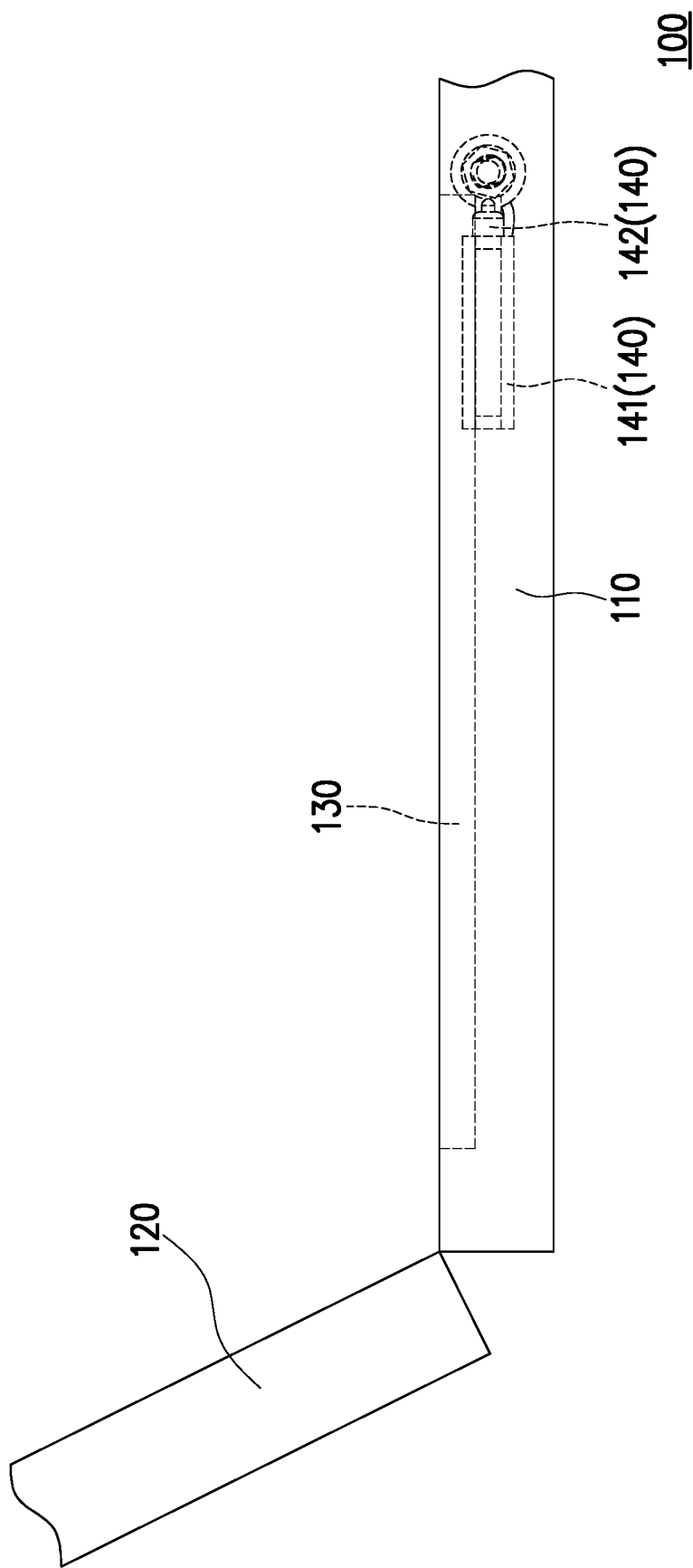
FIG. 2 is a schematic partial side view of an electronic device according to an embodiment of the disclosure.
Figure 3:
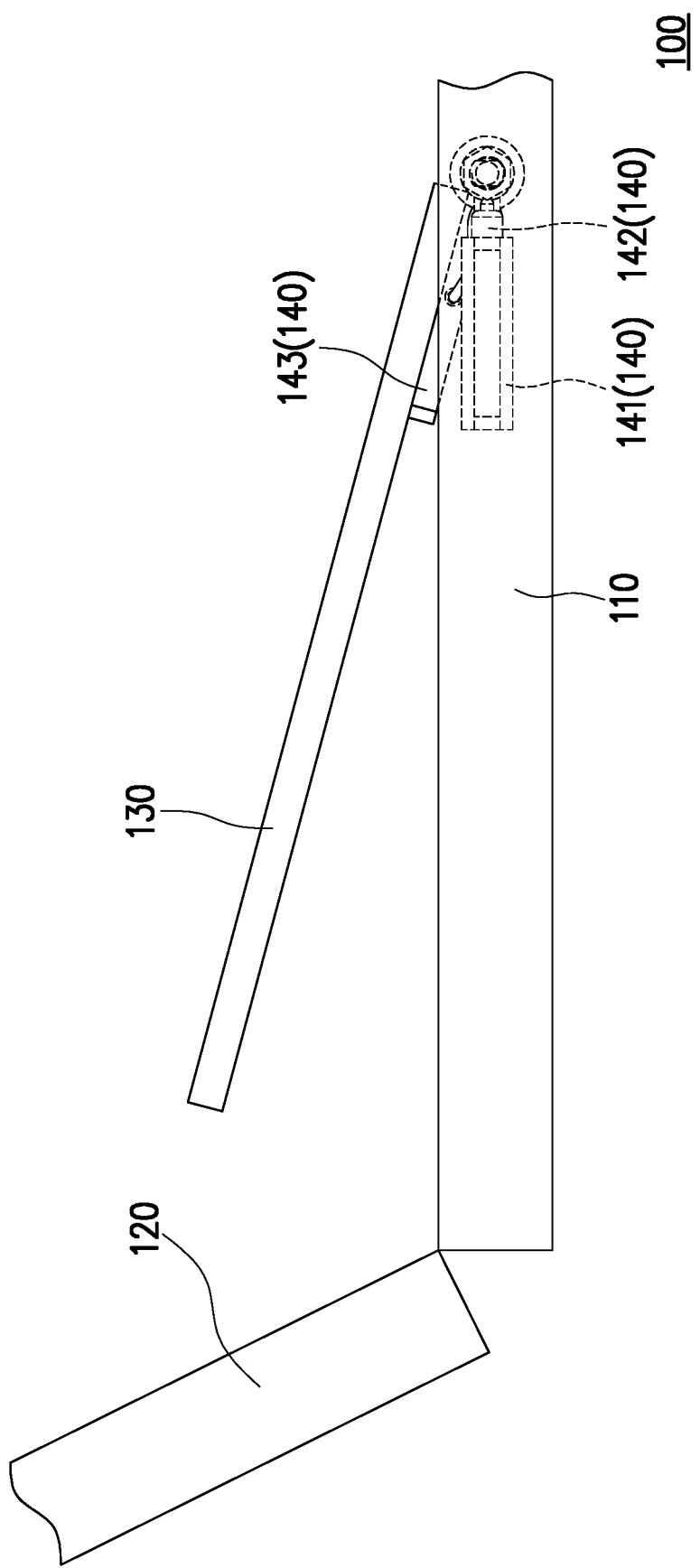
FIG. 3 is a schematic partial side view after an auxiliary display of FIG. 2 is lifted.

FIG. 1 is a schematic top view of an electronic device according to an embodiment of the disclosure. FIG. 2 is a schematic partial side view of an electronic device according to an embodiment of the disclosure. FIG. 3 is a schematic partial side view after an auxiliary display of FIG. 2 is lifted. Referring to FIG. 1 and FIG. 2, in this embodiment, the electronic device 100 may be a notebook computer, and includes a host 110, a main display 120, an auxiliary display 130, and a lifting mechanism 140. The host 110 is configured to perform functions such as logic operation, signal control, and data access, and the host display 120 is electrically connected to the host 110. The main display 120 is configured to display a main picture, and is pivoted to the host 110, to switch between an unfolded state and a closed state, and an unfolded angle of the main display 120 relative to the host 110 is adjustable.

The auxiliary display 130 is electrically connected to the host 110, and is disposed on the host 110. The auxiliary display 130 is configured to display an auxiliary picture, and has a touch function, thereby helping improve operation convenience and flexibility of the electronic device 100. On the other hand, the lifting mechanism 140 is disposed between the auxiliary display 130 and the host 110, and the auxiliary display 130 is connected to the host 110 by using the lifting mechanism 140. As shown in FIG. 2 and FIG. 3, the auxiliary display 130 may be rotated and lifted relative to the host 110 by using the lifting mechanism 140, to adjust a viewing and operation angle of the auxiliary display 130. This not only helps the user operate the auxiliary display 130, but also improves comfort of the user viewing the auxiliary display 130.

Figure 4A:
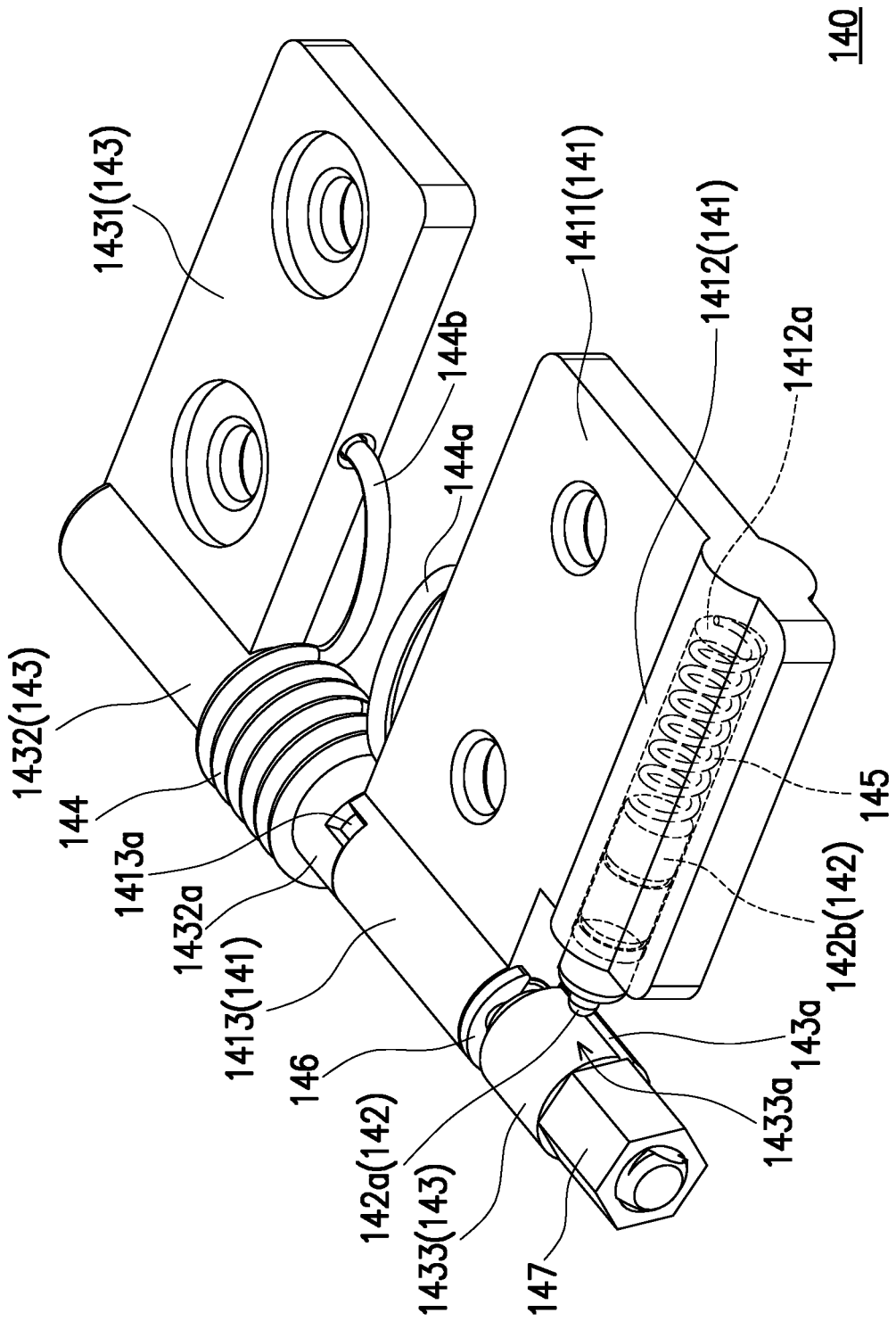
FIG. 4A and FIG. 4B are schematic diagrams of a lifting mechanism before and after actuation according to an embodiment of the disclosure.
Figure 4B:
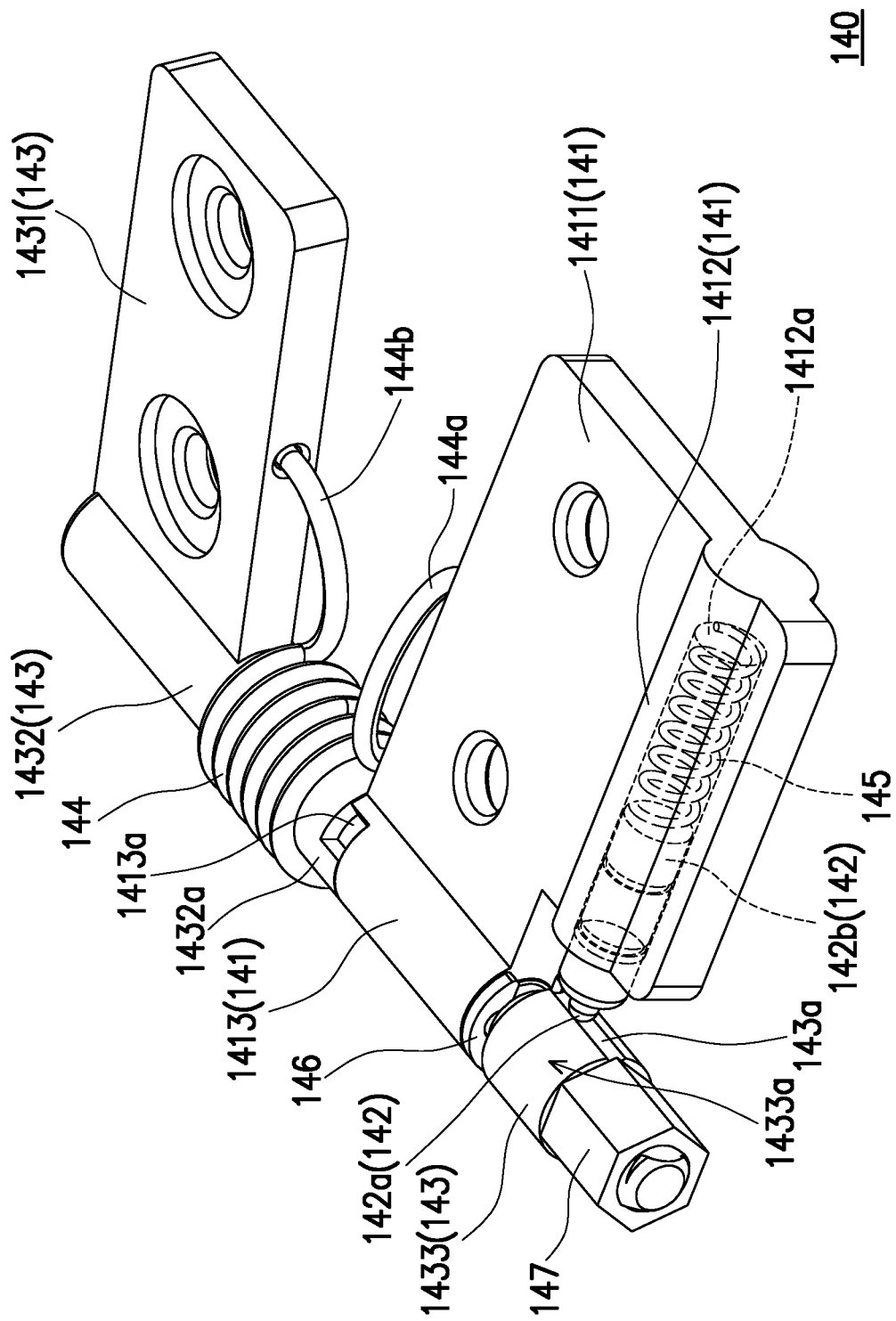

FIG. 4A and FIG. 4B are schematic diagrams of a lifting mechanism before and after actuation according to an embodiment of the disclosure. Referring to FIG. 2, FIG. 3, and FIG. 4A, in this embodiment, the lifting mechanism 140 includes a first bracket 141, a positioning pin 142, a second bracket 143, and a torsional spring 144. The first bracket is fixed to the host 110. The second bracket is fixed to the auxiliary display 130. The second bracket 143 is pivoted to the first bracket 141, so that the auxiliary display 130 may rotate relative to the first bracket 141 by using the second bracket 143. The positioning pin 142 is retractably disposed at the first bracket 141, and the second bracket is provided with a positioning notch 143a.

As shown in FIG. 2 and FIG. 4A, before the auxiliary display 130 is lifted, the positioning pin 142 is located outside the positioning notch 143a. As shown in FIG. 3 and FIG. 4B, after the auxiliary display 130 is lifted, the positioning pin 142 is engaged with the positioning notch 143a, and is configured to lock the angle and the height of the lifted auxiliary display 130. In addition, the torsional spring 144 includes a first end 144a and a second end 144b that are opposite, where the first end 144a is connected to the first bracket 141, and the second end 144b is connected to the second bracket 143.

As shown in FIG. 2 and FIG. 4A, before the auxiliary display 130 is lifted, the torsional spring is in a compressed state. Once an elastic restoring force of the torsional spring 144 is released, the torsional spring 144 pushes the second bracket 143 and the auxiliary display 130 to rotate and lift, as shown in FIG. 3 and FIG. 4B. After the second bracket 143 and the auxiliary display 130 are lifted, the torsional spring 144 supports the second bracket 143 and the auxiliary display 130.

Therefore, the lifted auxiliary display 130 may be stably supported and positioned, and does not easily shake or sink due to operation of the user on the auxiliary display 130. That is, the electronic device 100 has good operation reliability.

Referring to FIG. 1, in this embodiment, the electronic device 100 further includes a switch mechanism 150 and a keyboard 160 that are disposed on the host 110, where the auxiliary display 130 is located between the switch mechanism 150 and the keyboard 160, and the switch mechanism 150 is configured to lock the auxiliary display 130 on the host 110 or remove the locking relationship between the auxiliary display 130 and the host 110.

As shown in FIG. 1, FIG. 2, and FIG. 4A, when the switch mechanism 150 locks the auxiliary display 130 on the host 110, the torsional spring 144 is in a compressed state, and the positioning pin 142 is located outside the positioning notch 143a.

As shown in FIG. 1, FIG. 3, and FIG. 4B, when the switch mechanism 150 removes the locking relationship between the auxiliary display 130 and the host 110, the elastic restoring force of the torsional spring 144 pushes the second bracket 143 and the auxiliary display 130 to rotate and lift. After the second bracket 143 and the auxiliary display 130 are rotated and lifted, the positioning pin 142 is engaged with the positioning notch 143a.

As shown in FIG. 1 to FIG. 3, a position of the lifting mechanism 140 is far from the switch mechanism 150, and is close to the keyboard 160. Specifically, the lifting mechanism 140 drives the auxiliary display 130 to rotate and lift towards a position of the keyboard 160, and the auxiliary display 130 rotates and sinks towards a position of the switch mechanism 150 by using the lifting mechanism 140.

Referring to FIG. 2, FIG. 3 and FIG. 4A, in this embodiment, the first bracket 141 includes a first locking portion 1411 fixed to the host 110, a blind hole portion 1412 connected to the first locking portion 1411, and a sleeve portion 1413 connected to the first locking portion 1411, where the blind hole portion 1412 is configured to accommodate the positioning pin 142, and an extending direction of the blind hole portion 1412 and an extending direction of the sleeve portion 1413 are perpendicular to each other essentially.

On the other hand, the second bracket 143 includes a second locking portion 1431 fixed to the auxiliary display 130, a rotating shaft portion 1432 connected to the second locking portion 1431, and a positioning portion 1433 sleeved on and fixed to the rotating shaft portion 1432, where the first end 144a of the torsional spring 144 is connected to the first locking portion 1411, and the second end 144b is connected to the second locking portion 1431. In addition, the rotating shaft portion 1432 passes through the torsional spring 144 and the sleeve portion 1413, and the second locking portion 1431 and the positioning portion 1433 are located on two sides of the sleeve portion 1413.

Referring to FIG. 4A and FIG. 4B, the positioning notch 143a is located on the positioning portion 1433, where the positioning pin 142 is slidably disposed in the blind hole portion 1412, and the positioning pin 142 is disposed corresponding to the positioning portion 1433. That is, the positioning pin 142, the blind hole portion 1412, and the positioning portion 1433 are located on the same side of the sleeve portion 1413. The positioning pin 142 is in contact with the positioning portion 1433, and along with a change of a contact position of the positioning pin 142 on the positioning portion 1433, a length of a part exposed from the blind hole portion 1412 of the positioning pin 142 changes.

Specifically, the positioning pin 142 includes a positioning convex portion 142a and a force-bearing portion 142b. The positioning convex portion 142a is exposed from the blind hole portion 1412 and is in contact with the positioning portion 1433, and the force-bearing portion 142b is slidably disposed in the blind hole portion 1412. In addition, the lifting mechanism 140 further includes a compression spring 145, where the compression spring 145 is disposed in the blind hole portion 1412, and two ends of the compression spring 145 are connected to a bottom surface 1412a of the blind hole part 1412 and the force-bearing portion 142b respectively.

Further, the positioning portion 1433 is provided with a peripheral surface 1433a connected to the positioning notch 143a. When the positioning convex portion 142a is in contact with the peripheral surface 1433a, the compression spring 145 is pressed by the force-bearing portion 142b to have a first length. When the rotating shaft portion 1432 rotates, the positioning portion 1433 rotates synchronously with the rotating shaft portion 1432, so that the positioning convex portion 142a moves from the peripheral surface 1433a to the positioning notch 143a. When the positioning convex portion 142a moves from the peripheral surface 1433a to the positioning notch 143a, at least a part of the elastic restoring force of the compression spring 145 is released to push the force-bearing portion 142b, and enable the positioning convex portion 142a to be engaged with the positioning notch 143a. In this case, the compression spring has a second length greater than the first length.

Referring to FIG. 4A and FIG. 4B, in this embodiment, the rotating shaft portion 1432 is provided with a limiting convex portion 1432a facing the sleeve portion 1413, and the sleeve portion 1413 is provided with a limiting groove 1413a facing the limiting convex portion 1432a. The limiting groove 1413a extends along a circumferential direction, where the limiting convex portion 1432a is slidably disposed in the limiting groove 1413a, and coordination between the limiting convex portion 1432a and the limiting groove 1413a is used for determining a rotation range of the second bracket 143 and the auxiliary display 130 (shown in FIG. 2 and FIG. 3).

In addition, the limiting convex portion 1432a and the positioning portion 1433 are located on the two sides of the sleeve portion 1413, where the lifting mechanism 140 further includes a retaining ring 146 fixed to the rotating shaft portion 1432, and the retaining ring 146 may use a C-shaped retaining ring. The retaining ring 146 is located between the sleeve portion 1413 and the positioning portion 1433, where the retaining ring 146 abuts against one side of the sleeve portion 1413, and the sleeve portion 1413 is located between the retaining ring 146 and the limiting convex portion 1432a. Therefore, coordination between the retaining ring 146 and the limiting convex portion 1432a may be used for preventing the rotating shaft portion 1432 from sliding relative to the sleeve portion 1413.

In this embodiment, the lifting mechanism 140 further includes a nut 147 fixed to the rotating shaft portion 1432, where the positioning portion 1433 is located between the nut 147 and the sleeve portion 1413, and is located between the nut 147 and the retaining ring 146. The nut 147 may be configured to prevent the positioning portion 1433 from slipping from the rotating shaft portion 1432.

Based on the foregoing, the electronic device of the disclosure integrates the auxiliary display, and the angle and the height of the auxiliary display is adjustable, to help the user operate the auxiliary display, and improve the comfort of the user watching the auxiliary display. In addition, the auxiliary display is connected to the host by using the lifting mechanism, where the lifting mechanism includes the torsional spring and the positioning pin, the torsional spring is configured to lift and support the auxiliary display, and the positioning pin is configured to lock the angle and the height of the lifted auxiliary display. Therefore, the lifted auxiliary display may be stably supported and positioned, and does not easily shake or sink due to operation of the user on the auxiliary display. That is, the electronic device of the disclosure has the good operation reliability.

Although the disclosure has been described above by using the embodiments, the embodiments are not intended to limit the disclosure. A person of ordinary skill in any art may make some modifications and improvements without departing from the spirit and the scope of the disclosure. Therefore, the protection scope of the disclosure should be subject to the protection scope of the appended claims.

What is claimed is:

1. An electronic device, comprising:
   a host;
   a main display, pivoted to the host;
   an auxiliary display, disposed on the host; and
   a lifting mechanism, disposed between the auxiliary display and the host, wherein the lifting mechanism comprises:
      a first bracket, fixed to the host;
      a positioning pin, retractably disposed at the first bracket;
      a second bracket, fixed to the auxiliary display, wherein the second bracket is pivoted to the first bracket and the second bracket is provided with a positioning notch, and the positioning pin is located outside the positioning notch or is engaged with the positioning notch; and
      a torsional spring, provided with a first end and a second end that are opposite, wherein the first end is connected to the first bracket, and the second end is connected to the second bracket.

2. The electronic device according to claim 1, wherein the first bracket comprises a first locking portion fixed to the host, a blind hole portion connected to the first locking portion, and a sleeve portion connected to the first locking portion, the second bracket comprises a second locking portion fixed to the auxiliary display, a rotating shaft portion connected to the second locking portion, and a positioning portion sleeved on and fixed to the rotating shaft portion, the first end of the torsional spring is connected to the first locking portion, the second end is connected to the second locking portion, the rotating shaft portion passes through the sleeve portion, the second locking portion and the positioning portion are located on two sides of the sleeve portion, and the positioning notch is located on the positioning portion, wherein the positioning pin is slidably disposed in the blind hole portion and is disposed corresponding to the positioning portion.

3. The electronic device according to claim 2, wherein the positioning pin comprises a positioning convex portion and a force-bearing portion, wherein the positioning convex portion is exposed from the blind hole portion and is in contact with the positioning portion, and the force-bearing portion is slidably disposed in the blind hole portion.

4. The electronic device according to claim 3, wherein the lifting mechanism further comprises a compression spring, wherein the compression spring is disposed in the blind hole portion, and two ends of the compression spring are respectively connected to a bottom surface of the blind hole portion and the force-bearing portion.

5. The electronic device according to claim 3, wherein the positioning portion is provided with a peripheral surface connected to the positioning notch, and the positioning convex portion is in contact with the peripheral surface or is engaged with the positioning notch.

6. The electronic device according to claim 2, wherein the rotating shaft portion passes through the torsional spring.

7. The electronic device according to claim 2, wherein the rotating shaft portion is provided with a limiting convex portion facing the sleeve portion, the sleeve portion is provided with a limiting groove facing the limiting convex portion, the limiting convex portion is slidably disposed in the limiting groove, and the limiting convex portion and the positioning portion are located on the two sides of the sleeve portion.

8. The electronic device according to claim 7, wherein the lifting mechanism further comprises a retaining ring fixed to the rotating shaft portion, the retaining ring is located between the sleeve portion and the positioning portion, the retaining ring abuts against one side of the sleeve portion, and the sleeve portion is located between the retaining ring and the limiting convex portion.

9. The electronic device according to claim 2, wherein the lifting mechanism further comprises a nut fixed to the rotating shaft portion, and the positioning portion is located between the nut and the sleeve portion.

10. The electronic device according to claim 1, further comprising a switch mechanism and a keyboard that are disposed on the host, wherein the auxiliary display is located between the switch mechanism and the keyboard, the switch mechanism is configured to lock the auxiliary display on the host or remove a locking relationship between the auxiliary display and the host, and the lifting mechanism is far away from the switch mechanism and is close to the keyboard.

* * * * *